United States Patent [19]

Patel

[11] Patent Number: 4,907,683
[45] Date of Patent: Mar. 13, 1990

[54] DISC BRAKE OR CLUTCH

[75] Inventor: Kirit R. Patel, North Royalton, Ohio

[73] Assignee: Eaton Corporation, Cleveland, Ohio

[21] Appl. No.: 237,792

[22] Filed: Aug. 29, 1988

[51] Int. Cl.⁴ .............................................. F16D 25/06
[52] U.S. Cl. ............................ 192/85 AA; 192/91 A;
188/170
[58] Field of Search ....................... 192/85 AA, 91 A;
188/170

[56] References Cited

U.S. PATENT DOCUMENTS

| | | | |
|---|---|---|---|
| 2,584,191 | 2/1952 | Danly et al. | 188/170 |
| 2,667,954 | 2/1954 | Danly et al. | 188/170 |
| 2,698,676 | 1/1955 | Eason | 188/170 |
| 2,778,456 | 1/1957 | Ross | 188/170 |
| 3,195,692 | 7/1965 | Herr et al. | 188/170 |

Primary Examiner—Leslie A. Braun
Assistant Examiner—Andrea Pitts
Attorney, Agent, or Firm—M. L. Union

[57] ABSTRACT

A disc brake or clutch unit (10) comprising a rotor disc (12) having a fixed reaction member (21,23) on each side of the rotor disc (12) with the reaction members fixed in axially spaced relationship by connecting members (24,25) extending axially in position radially outwardly from the rotor disc. A pair of moveable reaction members (27,28) positioned between each side of the rotor disc (12) and one of the second fixed reaction members with the relatively moveable annular reaction members connected to each other a fixed axial distance apart by connecting members (29,30) extending axially and positioned radially outwardly from the rotor disc (12). Springs (35) are positioned between a first axially moveable reaction member (27) and a relatively fixed reaction member (23) for biasing the moveable reaction member (27) into fictional engagement with the disc (12). The fixed reaction member (23) and a moveable reaction member (28) forming an annular pressurized chamber (38) which when pressurized causes the moveable reaction members (28) to move axially away from the rotor discs to compress the springs (35) and disengage the annular axial moveable reaction members (27) from the discs (12).

6 Claims, 3 Drawing Sheets

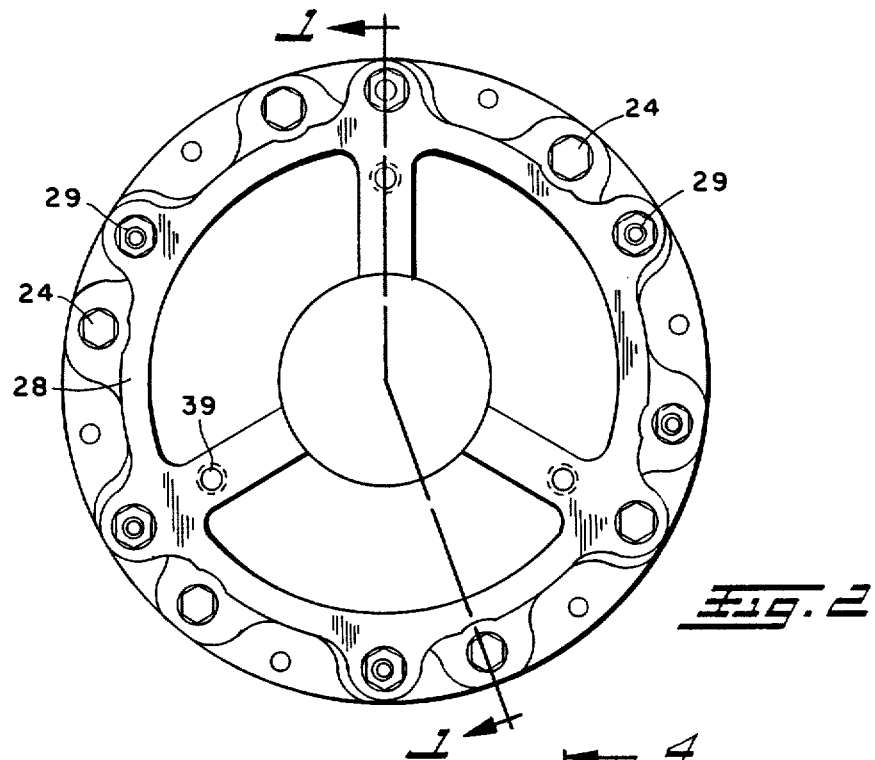
Fig. 2
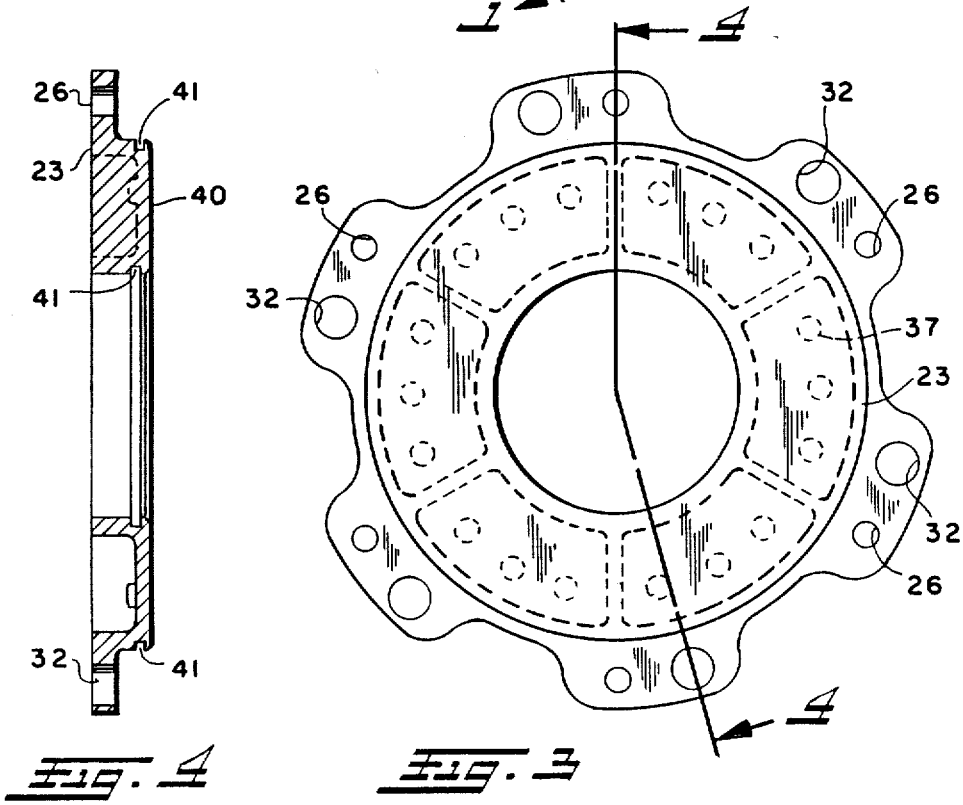
Fig. 4
Fig. 3

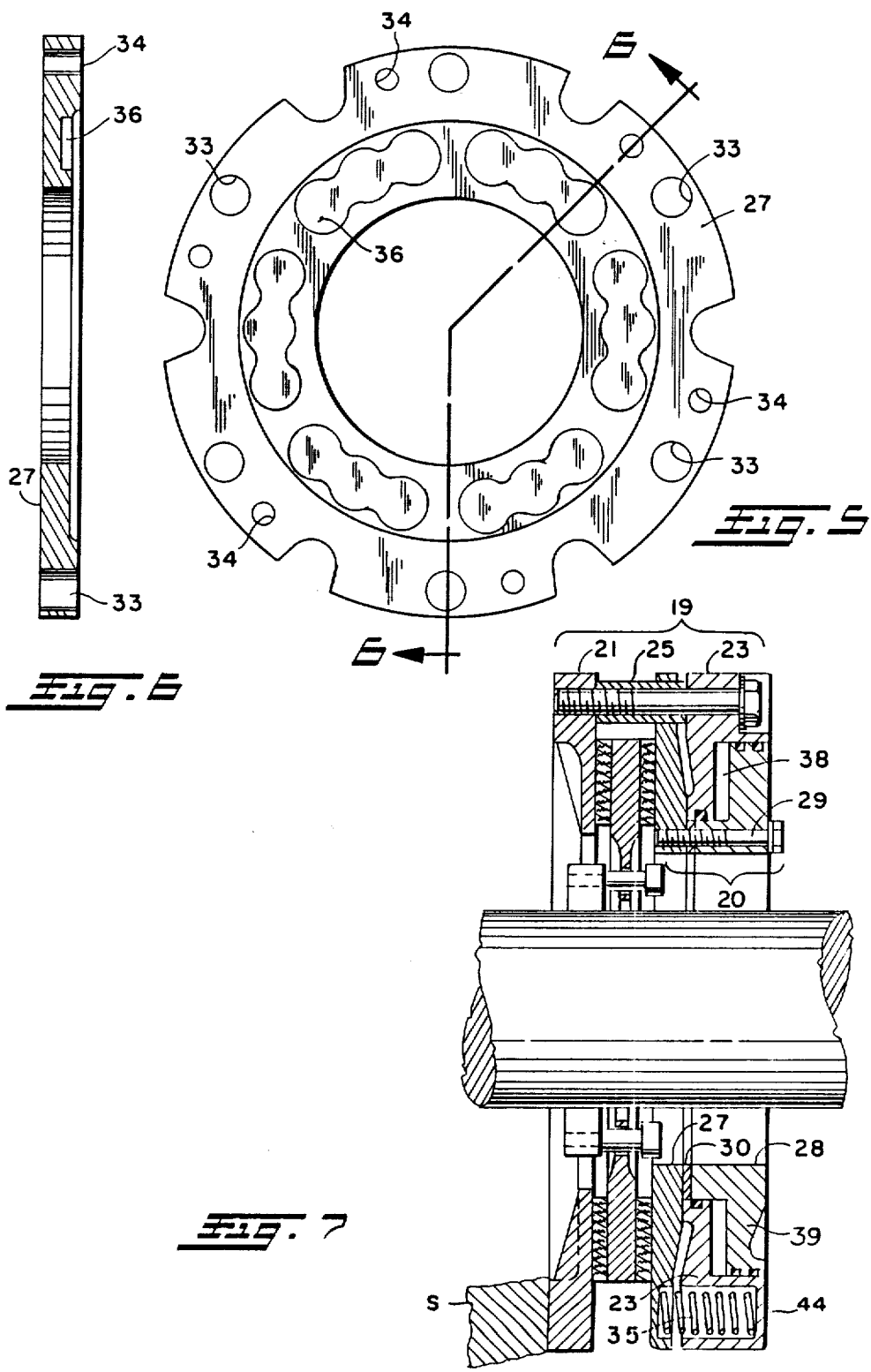

DISC BRAKE OR CLUTCH

This invention relates to air cooled or water disc brakes in which the brake is applied by a spring and released by air pressure or vise versa e.g. the brake is applied by air and released by springs. It will appreciated by those skilled in the art that the invention in its broader sense may be applicable to any such disc type brake or clutch or torque transmitting device whether air cooled or liquid cooled.

Torque transmitting devices of the disc type are known in the art and generally comprise an external housing which carries and positions annular axially moveable and fixed reaction members having a disc therebetween. U.S. Pat. No. 3,398,822 to Eakin discloses an air cooled spring applied brake or clutch which is air released by pressurization of a pressure chamber to axially move an end plate and pressure plate to overcome the force of the springs. The brake disc in the Eakin patent is provided with a spline coacting with an externally splined hub 10. Naturally the spline connection between the brake disc and the hub permits the brake disc to slide axially along the hub but necessarily restricts thediameter of the drive shaft.

On the other hand, prior art U.S. Pat. No. 3,862,678 to Collins discloses a liquid cooled torque transmitting device of the disc type provided with radially outer tube type spacers and bolts for connecting two fixed reaction end plates in fixed relationship and between which are mounted a pair of driven discs splined to the drive shaft.

It is an object of this invention to provide an improved torque transmitting device in which the friction disc assembly floats axially on bushings which are bolted to the hub which in turn is fixed to the shaft so that the shaft diameter nearly equal to the inner diameter to the friction rotor disc can be accommodated. Moreover, this arrangement eliminates the cost of cutting splined and/or gear teeth both in the hub and the rotor of the prior art friction disc assembly.

Another object of the invention is to provide a substantially commonality of components between spring applied and air applied devices in which a first plurality of connecting means secure a pair of fixed reaction members together and which extend through openings in one of a pair of moveable reaction members which are clamped between a second plurality of connecting means. Another object of the invention is to provide a torque transmitting device in which connecting means for the axially moveable members and the axially fixed members are positioned radially outwardly of the rotor disc and the reaction members.

In the accompanying drawings:

FIG. 2 is a end view of the brake shown in FIG. 1.

FIG. 3 is a plan view of the spring housing.

FIG. 4 is a cross-sectional view taken along the lines 4—4 of FIG. 3.

FIG. 5 is a plan view of the pressure disc.

FIG. 6 is a cross-sectional view taken along the lines 6—6 of FIG. 5.

FIG. 7 is a view similar to FIG. 1 of another embodiment of the invention.

Figure 1:
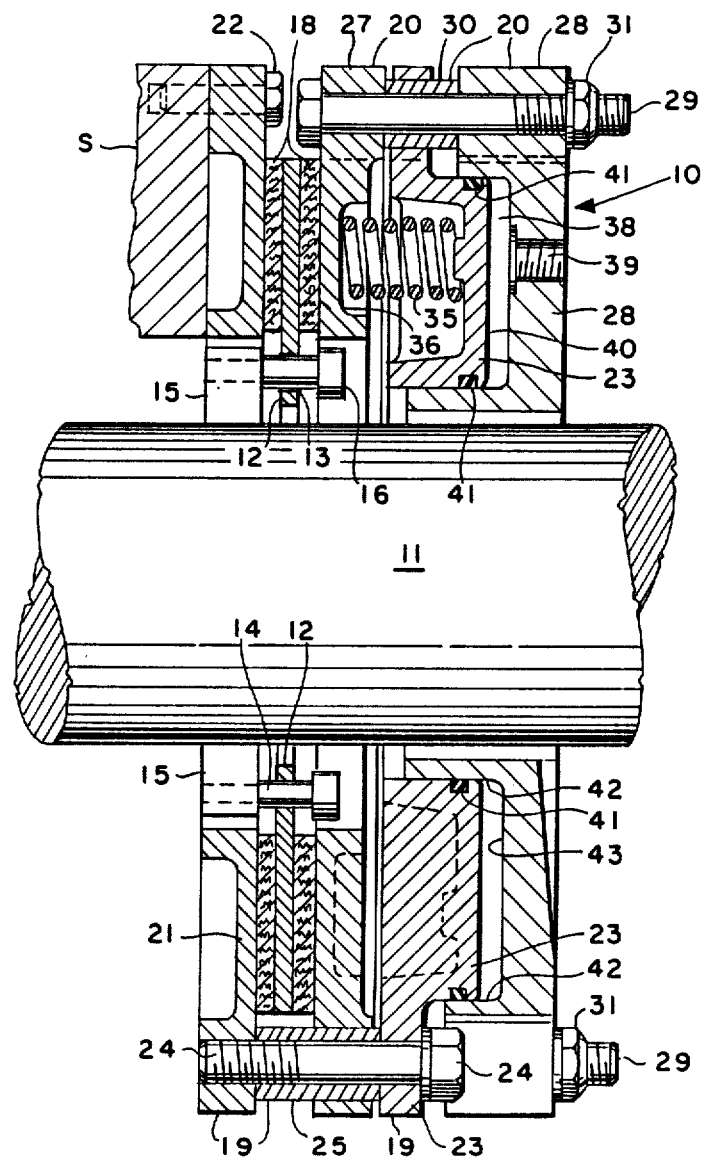
FIG. 1 is an axial sectional view through the spring applied air released brake or clutch of this invention taken along the line 1—1 of FIG. 2.

Referring to FIGS. 1 through 6 of the drawings, the spring applied brake 10 includes a rotatable brake assembly which includes a rotatable input shaft 11 and an annular radially disposed brake disc 12 which is secured to the shaft 11 for rotation in unison therewith but mounted or limited axial movement along the shaft 11. Preferably, the brake disc 12 is provided with a plurality of circumferentially faced holes 13 along its inner periphery. A stud or bolt 14 extends through each hole 13 and is threaded secured to an annular ring member 15 which is keyed, welded, or otherwise secured to the shaft 11. Each of the studs or bolts 14 may be provided with a head 16 to limit the axial movement of the brake disc 12 along the stud 14.

An annular friction disc 18, made of a well-known friction matter, is secured to each side of the brake disc 12. The brake assembly 10 also has a non-rotating structure which includes a rigid, fixed assembly 19 and a rigid axially moveable assembly 20.

The axially fixed assembly 19 includes a fixed spring housing 23 shown in FIGS. 3 and 4 and a fixed reaction disc member 21 rigidly mounted to a stationary support S by fasteners 22. The disc 21 and spring housing 23 are secured together by the studs or bolts 24 passing through the spacer tubes 25 and also through a hole 26 in the spring housing 23. The holes 26, the spacer tubes 25, and studs 24 are circumferentially spaced apart at the radially outer periphery of the housing 23. The ends of the spacer tubes 25 bear against the axially facing surfaces of the disc 21 and the spring housing 23 and the studs 24 secure the tubes 25 to the disc 21 and spring housing 23 to form an assembly 19.

The axially movable assembly 20 includes a pressure plate 27, shown in FIGS. 5 and 6, which is secured to the cylinder member 28 by the studs or bolts 29 passing through holes 34 in the plate 27 and in the spacer tubes 30 which are circumferentially spaced apart at the radially outer periphery thereof. The studs 29 pass through holes in the cylinder member 28 and are secured by the nuts 31. The studs 29 and tubes 30 also pass through holes 32 in the spring housing 23 and the tubes 25 pass through holes 33 in the pressure plate 27 so that the unitary assembly 20 is moveable axially as a unit. The movable assembly 20 is thus axially slidable a limited distance relative to the axial fixed assembly 19 with the studs 29 and tubes 30 of the assembly 20 slideable through the holes 32 in the spring housing 23. Also, the movable assembly 20 is supported for axial movement by the annular radially inner facing surface of the spring housing 23 slideably supported on the annular radially outer facing surfaces 42 of the cylinder member 28.

The axially moveable assembly 20 is normally biased to the left of FIG. 1, by a plurality of springs 35 so that the pressure plate 27 bears against the friction disc 18. One end of each of the springs 35 is positioned within a depression 36 in the pressure plate 27. The other end of each of the springs 35 surrounds a projection 37 in the spring housing. Each of the projections 37, the depressions 36 and the springs 25 27. The other end of each of the springs 35 surrounds a projection 37 in the spring housing. Each of the projections 37, the depressions 36 and the springs 35 are of course axially aligned and are located radially inwardly of the reseoptive studs 24 and tubes 25 as well as the studs 29 and spacer tubes 30.

The brake is released by injecting a pressurized fluid into the pressure chamber 38 defined by the annular face 40 of the spring housing 23 having suitable radially inner and outer seals 41 in sealing engagement with the radially facing surfaces 42 and the annular axially facing end surface 43 formed in the cylinder member 28. When pressurized fluid is injected through the orifices 39 into the chamber 38, the axial moveable assembly 20 is moved to the right of FIG. 1 so that the pressure plate 27 thereof is moved as light distance away from the friction disc 18, thus compressing the springs 35 and releasing the brake. When the pressure plate 27 is moved slightly to the right of FIG. 1, the brake disc 12 will move a slight distance along the bolt 14 so that braking forces are relieved between the fixed reaction disc 21 and the friction disc 18.

In the embodiment of the invention shown in FIG. 7, the axially fixed assembly 19 includes a fixed spring housing 23, a fixed reaction disc member 21 which are secured together by the studs 24 passing through spacer tubes 25 and also through holes in the housing 23 and disc member 21. The spacer tubes 25 and studs 24 are circumferentially spaced apart at the radially outer periphery of the spring housing 23, in a similar manner to that shown in FIG. 1.

The axially moveable assembly 20 of the modification shown in FIG. 7 includes a pressure plate 27 which is secured to the cylinder member 28 by studs 29 passing through holes in the pressure plate and in the spacer members 30 which are circumferentially spaced apart at the radially inner periphery thereof. The spring housing 23 includes a plurality of radially spaced cup-shaped members 44 at the radially outer most periphery thereof for housing the springs 35. The cup-shaped members 44 are positioned radially outwardly of the studs 29 and spacer members 30. The pressure chamber 38 is located radially between the inner studs 29 and spacer members 30 and the outer studs 24 and spacer tubes 25 with the chamber 38 located axially intermediate the ends of the inner studs 29.

The brake shown in FIG. 7 is released by injecting pressurized fluid into the pressure chamber 38 through the orifices 39 to move the axial moveable assembly 20, thereby compressing the springs 35 and releasing the brake.

I claim:
1. A spring applied coupling device comprising:
 a relatively rotatable input shaft rotatable about an axis of rotation:
 a radially outwardly extending rotor disc including inner and outer peripheral surfaces and means for mounting said disc for rotation with said input shaft;
 a first annular axially fixed reaction member adjacent one side of said rotor disc;
 a second annular axially fixed reaction member positioned on the opposite side of said rotor disc;
 a plurality of first connecting means for connecting said first and second axially fixed reaction members in fixed axially-spaced relationship, all of said plurality of connecting means extending axially and positioned radially outwardly from said outer peripheral surface of said rotor disc;
 a first annular axially movable reaction member positioned between said opposite side of said rotor disc and said second axially fixed reaction member;
 a second relatively movable annular reaction member;
 a plurality of second connecting means for connecting said first and second movable reaction members to each other a fixed axial distance apart, all of said plurality of connecting means extending axially and positioned radially outwardly from said outer peripheral surface of said rotor disc;
 an annular disc of friction material secured between each radially extending side of said rotor disc and said first fixed and said first movable reaction members;
 spring means between said first axially movable reaction member and said second relatively fixed reaction member for biasing said movable reaction member into frictional engagement with said disc;
 a second fixed reaction member and second movable reaction member forming an annular pressure chamber which when pressurized causes said movable members to move axially away from said rotor disc to compress said spring means and disengage said first annular annular axially movable reaction member from said disc.

2. A spring applied coupling device as claimed in claim 1 in which said first movable reaction member is slidably mounted on said first connecting means and wherein said first connecting means includes a spacer tube position between said first and second relatively fixed reaction members and fastener means for securing said first and second reaction members together, said fastener means passing through said tubular spacer means.

3. A spring applied coupling device as claimed in claim 1 in which said second connecting means includes a spacer tube positioned between said first and second moveable reaction members and fastener means for securing said first and second reaction members together, said fastener means passing through said tubular spacer means.

4. A spring applied coupling as defined in claim 1 wherein said second fixed reaction member comprises an annular piston, said second movable reaction member comprises an annular chamber for receiving said annular piston therein and for defining said annular pressure chamber between said annular piston and said annular chamber, said annular pressure chamber when pressurized effecting movement of said second movable reaction member relative to said annular piston to compress said spring means and disengage said first annular reaction member from said disc.

5. A spring applied coupling device as claimed in claim 4 in which each of said plurality of said first and second connecting means are disposed an equal radial distance from the axis of rotation of said input shaft, are offset circumferentially and are accessible from one side of said device.

6. A spring applied coupling device as claimed in claim 4 in which said pressurized chamber is positioned radially inside of said first and second connecting means.

* * * * *